48-210

DRAFTSMA

BEST AVAILABLE COPY

UNITED STATES PATENT OFFICE

WILLIAM ELMER, OF NEW YORK, N. Y.

IMPROVEMENT IN GASIFYING FUEL FOR HEATING, &c.

Specification forming part of Letters Patent No. 87,156, dated February 23, 1869; antedated February 13, 1869; reissue No. 5,283, dated February 18, 1873.

*To all whom it may concern:*

Be it known that I, WILLIAM ELMER, of the city, county, and State of New York, have invented a new and useful Method or Process for Gasifying Fuel for Heating Purposes; and I do declare that the following is a full and clear description of my said invention.

In order that my said invention may be fully understood, I deem it necessary to make some general remarks in regard to the composition and nature of fuel, and the results that are produced by subjecting substances used as fuel to the process of distillation out of contact with the atmosphere, and the action upon the product of such distillation of very high heat.

All the various hydrocarbon substances ordinarily used for fuel, such as coal, wood, peat, &c., are composed mainly of the same elements. Wood and peat are composed of carbon, hydrogen, oxygen, nitrogen, water, and inorganic substances. Coal of various kinds contains carbon, hydrogen, oxygen, nitrogen, sulphur, and inorganic constituents. When fuel is burned in the ordinary way, a large amount of carbon escapes combustion and is carried off by the flue in the form of smoke, free carbon, or soot, and is lost as a heat-producing agent; the loss of heat carried off by the products of combustion and otherwise is also very large. This is seen in burning bituminous coal, which, as ordinarily burned, has a lower heating power than anthracite coal, notwithstanding the hydrogen it contains, for the reason that the hydrocarbon vapors and the smoke as free carbon not only escape combustion, but become the vehicle for conveying away a large amount of heat, which, together with the heat contained in the products of combustion, is carried off by the flue. The loss of heat passing off by the flue from an ordinary grate-fire is about five-eighths, and that from stoves and furnaces three-eighths of the whole amount generated by combustion. An unknown quantity of heat is likewise expended in the conversion of fuel into gases before combustion can occur. The compounds in fuel, of which oxygen is a constituent, reduce the actual amount of carbon and hydrogen available for combustion, the very elements which alone, by combustion, are capable of generating heat. Nitrogen compounds also reduce both the carbon and hydrogen. The water contained in wood and peat is very objectionable on account of the heat that is necessarily expended in converting the water into vapor, which also becomes the vehicle for the transmission of heat. Loss of heat occasioned by the presence of sulphur in coal is just in proportion to the amount of hydrogen and carbon entering into combination with the sulphur. The inorganic substances constitute the ashes when fuel is burned.

Now, of all the elements constituting fuel, hydrogen and carbon are the only substances which in their union with oxygen by combustion can take part in the production of heat; and while the amount of heat evolved by the former is always the same, that generated by the latter depends upon the nature of the compound produced by the combustion, or the proportion in which it combines with the oxygen. When carbon is fully oxidized and converted into carbonic acid, the amount of heat is much greater than when it is converted into carbonic oxide, so that carbon has two degrees of caloric power, corresponding to the two degrees of oxidation. In the combustion of carbon, if the supply of oxygen be insufficient to the production of carbonic acid, a slow combustion takes place, resulting in carbonic oxide.

In order to economize this loss of fuel and heat, and at the same time to obtain the largest amount of heat from different fuels they are capable of yielding, I propose to separate and gasify the elements in fuel on which the production of heat depends from the objectionable or non-available elements.

To accomplish this object, I first distill the fuel in a closed retort, applying that degree of heat which will completely vaporize its entire volatile elements, leaving only solid carbon and such inorganic substances as are not susceptible of vaporization or conversion into gas—say, about 800° to 1000° Fahrenheit. The product of this distillation, consisting of hydrocarbon compounds, the vapor of water, &c., I conduct immediately, and without material loss of its heat, into a second retort or series of retorts that is heated up to at least 2000, and preferably to from 2500 to 3000° Fahrenheit—a temperature in which the said compounds are decomposed, the hydrogen being set free principally, and such portion as is not so set free being combined with only a single equivalent of carbon, forming a light hydrocarbon, highly useful as a heat-giving gas. The oxygen that is liberated in this decomposition will unite with a portion of the highly-heated carbon, forming carbonic oxide—a gas as inflammable as hydrogen. These several gases all commingle by a well-known law, and unite to swell the aggregate useful result. It is essential in this process that a degree of heat be employed in the second or gas-making retort or retorts sufficiently high, as above stated, to effect the object aimed at—namely, the decomposition of the several compounds present, of which hydrogen is an element, and thereby either setting free all of that gas contained in the fuel, or leaving such portions as are not entirely separated united with only a single equivalent of carbon in the form of a light hydrocarbon gas, while the resulting union of the oxygen present and carbon to form carbonic oxide is the necessary result of the liberation of oxygen in the presence of highly-heated carbon set free by the decomposition of the hydrocarbon compounds. If a lower degree of heat is applied than will effect this complete decomposition, the result will be that the several compounds remaining undecomposed will on cooling condense into fluids, presenting themselves as ammonia, tar, water, &c., in which will be locked up a large quantity of hydrogen, while the gas that will pass over will be bicarbureted hydrogen or illuminating-gas, and this will be recognized as the ordinary process of making the last-named gas.

The object of this invention is not to obtain an illuminating-gas, it not being adapted thereto, except as the gas-fuel I produce may be used as the basis of illuminating-gas by carburization; but my object is rather to obtain a convenient and useful fuel for heating purposes; and it will be seen that the peculiarity of my process in practically manufacturing such gas-fuel consists in subjecting the vaporized and gasified compounds resulting from the distillation of crude fuel, as described, directly, and before they have the opportunity by cooling of condensing, to the action of that high degree of heat stated, which will decompose the several compounds present that contain hydrogen, thereby either liberating all of that gas that is present, or leaving such portions as are not set entirely free combined with only a single equivalent of carbon, forming a light hydrocarbon gas—an inflammable useful gas for heating purposes—at the same time producing carbonic-oxide gas formed by a union of the oxygen liberated by the decomposition of the aqueous vapor with the carbon deposited from the fuel by the action of the high heat.

I will now proceed to describe an apparatus that may be conveniently employed in carrying out and applying my process.

I employ a bench of three retorts, arranged in the usual way—that is, two retorts set parallel to each other over the fire-chamber, and the third one directly over these two. Of course any number of retorts sufficient to carry out the process may be employed and arranged in any way most convenient. The upper retort may be large, while the other two may be of the usual size.

In practice I find it more economical to divide the two lower retorts through the center, by means of a partition fitted closely to the top and bottom by inserting it in a groove or channel extending the whole length of the retorts. This partition is provided with a flue or opening near the back end of the retorts. In all other respects it is gas-tight, and makes two retorts of one, having two separate lids, as most convenient.

The object of dividing the retorts by a partition is twofold: First, by this means the proper connections of the retorts with each other may be made at the front of the bench, by means of pipes attached to the mouth-pieces of the retorts, instead of connecting them both at the front and back of the bench, as would be the case were it not for these partitions; and, second, to make one retort answer the purpose of two, thus economizing both retorts and fuel.

The retorts are connected as follows: A pipe is inserted in the mouth-piece of the upper retort, and extends to and is inserted in the outer side of the mouth-pieces of one of the lower retorts, which may be called the second retort. To the outer side of the mouth-piece of the other or third retort is connected the stand-pipe or pipe for conducting the gas into the holder. The two lower retorts are connected with each other by means of a pipe inserted in the inner sides of the two mouth-pieces—that is, the sides nearest to each other.

For practical operations I would recommend a bench of six retorts instead of three, and that the retorts into which the materials to be gasified are placed be of very large dimensions, sufficiently large to hold each half a cord of wood or a ton or more of coal or peat.

During the process of gasifying fuel it is necessary to keep the gas-making retorts at a white heat, or a heat of from 2700° to 3000° Fahrenheit. They must therefore be made of clay, in order to endure the high heat, and not of iron.

*Operation of a Bench of three Retorts.*

The fuel to be gasified is placed in the large retort, where all the volatile products it contains are given off, and as fast as these products are generated they are conveyed directly into one of the retorts below, and first pass to the back end of this retort upon one side of the partition, and through the flue or opening in the partition and back on the other side of the partition to the front; thence through the connecting-pipe into the other retort, and to the back end of this retort, upon one side of the portion, through the opening and back on the other side to the front. During the passage of the volatile products through the retorts they are converted into permanent gas—hydrogen and light hydrocarbon. The two lower retorts are filled or partially filled with carbon, charcoal, or other forms of carbon, as coke, anthracite coal, &c., the object of which is to decompose the carbonic acid that may be present, and to convert it into carbonic oxide; also, to decompose the aqueous vapor and other compounds present, and convert them into inflammable gases. In the decomposition of the volatile hydrocarbon vapors a portion of the carbon they contain is deposited in the retorts; this carbon, together with the residue carbon in the large retort, or so much of the latter as may be desirable, may also be transformed into inflammable gases, by bringing highly heated steam in contact with the carbon.

The great and many advantages of such a gas-fuel over crude fuel are too obvious to need explanation.

*Claims.*

What I claim as my invention, and desire to secure by Letters Patent, is—

1. The process or method herein described of gasifying crude fuel by subjecting it, out of contact with the atmosphere, to the process of distillation described, and by subjecting the distillate, in a second retort or series of retorts, to a temperature sufficiently high, not less than 2000° Fahrenheit, as specified, to convert the distilled products into permanent inflammable gases, substantially as above set forth.

2. A clay gas-retort divided into two chambers by a partition inserted directly in the retort without any intervening flues or pipes, constructed and arranged as and for the purpose herein specifically described.

In testimony whereof I have hereunto set my hand this 8th day of November, 1872.

Witnesses: WILLIAM ELMER.

J. P. FITCH,

A. LIVINGSTON MILLS.